(12) United States Patent
Brown et al.

(10) Patent No.: US 11,657,281 B2
(45) Date of Patent: May 23, 2023

(54) METHOD AND SYSTEM FOR SYMMETRIC RECOGNITION OF HANDED ACTIVITIES

(71) Applicant: Hinge Health, Inc., San Francisco, CA (US)

(72) Inventors: Colin Brown, Saskatoon (CA); Andrey Tolstikhin, Montreal (CA)

(73) Assignee: Hinge Health, Inc., San Francisco, CA (US)

( * ) Notice: Subject to any disclaimer, the term of this patent is extended or adjusted under 35 U.S.C. 154(b) by 1 day.

(21) Appl. No.: 17/593,270

(22) PCT Filed: Mar. 12, 2020

(86) PCT No.: PCT/IB2020/052249
§ 371 (c)(1),
(2) Date: Sep. 14, 2021

(87) PCT Pub. No.: WO2020/188424
PCT Pub. Date: Sep. 24, 2020

(65) Prior Publication Data
US 2022/0148296 A1    May 12, 2022

(30) Foreign Application Priority Data

Mar. 15, 2019    (CA) ................................ CA 3036836

(51) Int. Cl.
*G06V 10/774* (2022.01)
*G06V 40/10* (2022.01)
*G06V 40/20* (2022.01)

(52) U.S. Cl.
CPC ........ *G06V 10/7747* (2022.01); *G06V 40/107* (2022.01); *G06V 40/20* (2022.01)

(58) Field of Classification Search
CPC ... G06V 10/7747; G06V 40/20; G06V 40/107
See application file for complete search history.

(56) References Cited

U.S. PATENT DOCUMENTS

| 8,113,843 B2 | 2/2012 | Naya |
| 9,770,179 B2 | 9/2017 | Etemad et al. |
| (Continued) | | |

FOREIGN PATENT DOCUMENTS

| JP | 4590010 | 12/2010 |
| JP | 2011-123411 | 6/2011 |
| (Continued) | | |

OTHER PUBLICATIONS

PCT International Application No. PCT/IB2020/052249, International Search Report and Written Opinion of the International Searching Authority, dated Jun. 9, 2020, 3 pages.
(Continued)

*Primary Examiner* — David F Dunphy
(74) *Attorney, Agent, or Firm* — Perkins Coie LLP

(57) ABSTRACT

This disclosure describes an activity recognition system for asymmetric (e.g. left- and right-handed) activities that leverages the symmetry intrinsic to most human and animal bodies. Specifically, described is 1) a human activity recognition system that only recognizes handed activities but is inferenced twice, once with input flipped, to identify both left- and right-handed activities and a training method for learning-based implementations of the aforementioned system that flips all training instances (and associated labels) to appear left-handed and in doing so, balances the training dataset between left- and right-handed activities.

20 Claims, 3 Drawing Sheets

(56) References Cited

U.S. PATENT DOCUMENTS

| | | | |
|---|---|---|---|
| 9,782,104 B2 | 10/2017 | MacEachern et al. | |
| 10,327,670 B2 | 6/2019 | Etemad et al. | |
| 10,482,333 B1* | 11/2019 | El Kaliouby | G16H 20/70 |
| 10,575,760 B2 | 3/2020 | Houmanfar et al. | |
| 2011/0140929 A1 | 6/2011 | Naya | |
| 2011/0213582 A1 | 9/2011 | Naya | |
| 2015/0272457 A1 | 10/2015 | Etemad et al. | |
| 2015/0272482 A1 | 10/2015 | Houmanfar et al. | |
| 2015/0272483 A1 | 10/2015 | Etemad et al. | |
| 2015/0272501 A1 | 10/2015 | MacEachern et al. | |
| 2018/0189556 A1 | 7/2018 | Shamir et al. | |
| 2022/0080581 A1* | 3/2022 | Wang | B25J 9/0081 |

FOREIGN PATENT DOCUMENTS

| | | |
|---|---|---|
| WO | 2016/149829 | 9/2016 |
| WO | 2016/149830 | 9/2016 |
| WO | 2016/149831 | 9/2016 |
| WO | 2016/149832 | 9/2016 |

OTHER PUBLICATIONS

European Search Report dated Nov. 8, 2022 for European Patent Application No. 20773890.7, 11 pages.
"Decision tree", Retrieved on Oct. 22, 2021 from the internet from URL: https://en.wikipedia.org/w/index.php?title=Decision_tree&oldid=811274714, Nov. 20, 2017.
Ruta, Michele, et al., "Semantic Matchmaking 1-15 for Kinect-Based Posture and Gesture Recognition", 2014 IEEE International Conference on Semantic Computing, XP032629572, Jun. 16, 2014, pp. 15-22.

* cited by examiner ered twice, once with input flipped horizontally, to
METHOD AND SYSTEM FOR SYMMETRIC RECOGNITION OF HANDED ACTIVITIES

CROSS-REFERENCE TO RELATED APPLICATION

This application is a National Stage of PCT/IB2020/052249, filed Mar. 12, 2020, which claims priority to Canadian Application No. 3,036,836, filed Mar. 15, 2019, which are herein incorporated by reference in their entireties.

FIELD

This disclosure relates to systems and methods for computer-based recognition of activities. Specifically, it relates to recognition of those activities that are not left-right symmetric.

BACKGROUND

Deep learning-based methods have been proposed that detect human activities in video data (e.g. waving, running). Many human activities are left-right asymmetric (e.g. shaking hands, kicking a ball) but may be performed equally on either side of the body. There exist a broad range of applications for activity recognition methods that can differentiate between left- and right-handed executions of a given activity and consider each as a separate class. For example, in a soccer analytics application, it may be important to distinguish between a player shooting with their left foot or right foot.

Furthermore, this kind of activity recognition may be more broadly applicable to non-human animals, robots or symmetric actors of any kind. For example, in animal research, it may be useful to have a system that can distinguish asymmetric activities performed by an animal predominantly on its left or right side.

However, requiring an activity recognition system to distinguish between left- and right-handed activities effectively doubles the number of classes that may be predicted, which may increase the cost and complexity of the activity recognition system as well as the training database and training procedure for learning-based systems.

An additional challenge that arises for learning-based systems stems from the imbalanced population distribution of persons who are predominantly left-handed versus those who are predominantly right-handed. Trained learning-based classifiers can be sensitive to the distribution of classes in the database. However, it is common for large training datasets to be sampled from public data and it is known that a vast majority of the human population is right-handed. Thus, while it may be desirable for an activity recognition to be equally accurate for left- and right-handed activities, it may be challenging to acquire a training dataset with equal numbers of left- and right-handed activity examples, especially if the dataset is sampled from public data.

It is therefore desirable for an improvement in recognizing symmetric and non-symmetric activities.

SUMMARY

This disclosure describes an activity recognition system for left-right asymmetric (e.g. left- and right-handed) activities that leverages the left-right mirror symmetry intrinsic to most human and animal bodies. Specifically, described is 1) an activity recognition system that only recognizes activities of one handedness (e.g. only left handed activities) but is inferenced twice, once with input flipped horizontally, to identify both left- and right-handed activities and 2) a training method for learning-based implementations of the aforementioned system that flips all training instances (and associated labels) to appear left-handed and in doing so, balances the training dataset between left- and right-handed activities.

BRIEF DESCRIPTION OF THE DRAWINGS

In drawings which illustrate by way of example only a preferred embodiment of the disclosure.

DETAILED DESCRIPTION

Activity Recognition System

Figure 1:
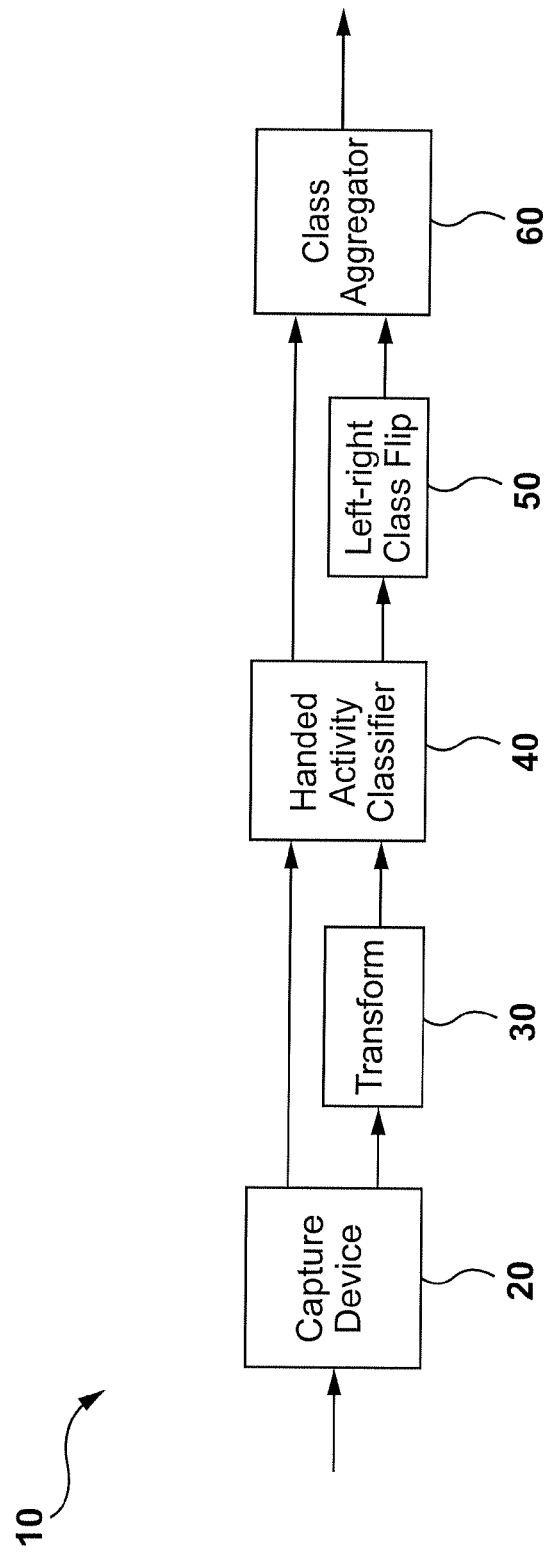
FIG. 1 is a representation of an activity recognition system as a block diagram.

The activity recognition system 10, may comprise a capture device 20, a transform module 30 to flip input from this capture device horizontally, a handed activity classifier 40, a module to perform a left-right flip on the activity class output from the left-right activity classifier 50. The activity recognition system may also contain a class aggregator component 60 to determine the final activity class or classes given information from both flipped and non-flipped input.

An activity class is a named activity or plurality of related activities (e.g. 'waving' which may denote waving at one of a variety of different speeds and/or in one of many different fashions) by some actors (e.g. person, animal) at some temporal scale (e.g. still image of an activity being performed, short gestures like winks, long activities like golfing). An activity class such as 'none', 'default' or 'idle' may represent the absence of a relevant activity. The plurality of valid activity classes and the representation of an activity class may depend on the application of the activity recognition system and on the specific embodiment of that system.

An activity class may be associated with a handedness (left or right) if it is typically performed left-right asymmetrically in some way. Such an activity need not be performed exclusively with one hand nor with one side of the body but may be labelled appropriately as left- or right-handed such as by the dominant or leading side of the body, to distinguish it from its symmetric counterpart. Activity classes representing activities that are performed with left-right symmetry may be considered as special cases of asymmetric activity classes in which the left- and right-handed activity classes denote the same activity or plurality of activities. For example, head nodding may be an activity that does not require left-right activity classes. Similarly, for some applications of a classifier it may not matter whether the activity is left- or right-handed. For example, for 'car driving', it may not matter if the driver is holding the steering wheel with the right or left hand or both hands.

Data from a capture device 20 may be provided to the handed activity classifier 40 from which an activity class or plurality of class probabilities may be inferred and then may be passed to a class aggregator module to determine the outputted activity class or classes 60. Data from the capture device may also be provided to the transform module 30, such as a horizontal flip. The activity data from the capture device 20 may be sent simultaneous, or sequentially, in either order, to the horizontal flip transform module and the handed activity classifier 40. The transform module 30 may perform a left-right flip transform on the input data before the handed activity classifier 40 infers a handed activity class or plurality of class probabilities. The activity class (or classes) from the flipped input data may then be left-right flipped 50 (i.e. from a left-handed class to a right-handed class) and may be provided as a second input to the class aggregator module 60, which may determine a final activity class or plurality of classes given the two inputs.

Each of these components are described below in detail.

The capture device 20 may be embodied by a system or device for accessing, capturing or receiving activity data. For example, the activity data may comprise images, video files, live video data such as from a webcam, video streaming client, human pose estimation system, or a motion capture system. The activity data preferably is capable of representing persons or other relevant actors (e.g. animals, androids) in some spatially coherent manner. For example, the activity data may comprise one or more image frames of a video, image of depth values from a depth camera, and/or 2D or 3D skeleton/marker points. The activity data may be temporal, such as a sequence of frames or atemporal, such a single frame.

The transform module 30 may accept input data from the capture device and then perform a left-right (horizontal) flip transformation on that data. The exact form of the transformation may depend on the format of data provided by the capture device (e.g. image data versus skeleton data) but the result is the activity data is flipped horizontally so that events, or activities on the left side of the activity data are transformed to the right side and vice versa.

For example, the transform module 30 may accept a set of key-points representing skeletal joints of a targeted person as an array of X and Y coordinates, normalized in the range 0 to 1. In this case, the horizontal flip module may flip the X coordinates of each joint as 1-X and leaving the Y coordinates unaltered. For activity data that is video or images, the horizontal flip module may transform the data using a mirror image transformation.

In applications with other expected asymmetries and symmetries in the input and training data, other types of transformations may be used. For example, in some applications, vertical symmetry may be present and instead of a horizontal flip module, a vertical flip module may be used as a transform module. Similarly, for temporal activity data, the transform module may re-order the activity data in reverse time order if forward/backward time symmetry exists in the application. The transform module may do one or more transformations, and in some applications multiple transform modules may be used in parallel and sequence if the activity classes contain more activities. For example, using both a horizontal flip module and a vertical flip module, an activity may be inferred as left-handed and upside down.

The handed activity classifier 40 may accept flipped or non-flipped input activity data and output an inferred activity class or plurality of class probabilities of one particular handedness.

The handed activity classifier 40 may identify left-handed activities or may equally identify right-handed activities. As is noted above, a left-handed activity class may not necessarily represent activities performed exclusively with the left-hand but instead are some activities that are performed in an asymmetric way and are deemed as left-handed to distinguish them from their right-handed counterparts. For example, a left-handed activity classifier designed for analysis of tennis footage may recognize forehanded strokes only when it is viewed to be performed with the player's left hand and may otherwise output some non-activity class.

While a single handed activity classifier 40 is shown, in embodiments, there may be two handed activity classifiers, with a first classifier accepting the non-flipped input activity data and a second classifier accepting the flipped input activity data. If a single handed activity classifier is used, it may process both the flipped and non-flipped input activity data, simultaneously but separately, or sequentially to separately infer an activity class for each of the flipped input activity data and the non-flipped input activity data. In an embodiment, a handed classifier may be loaded into memory once and then the frame run through the classifier once unflipped and once flipped.

The handed activity classifier may be implemented by a classifier, such as a convolutional-neural-network-based classifier, decision tree, support-vector-machine, or handcrafted classifier. The handed activity classifier may accept input data from the capture device and output one activity class or a plurality of class probabilities. The classifier may use temporal information if present, such as by using a recurrent-neural-network (RNN).

Figure 3:
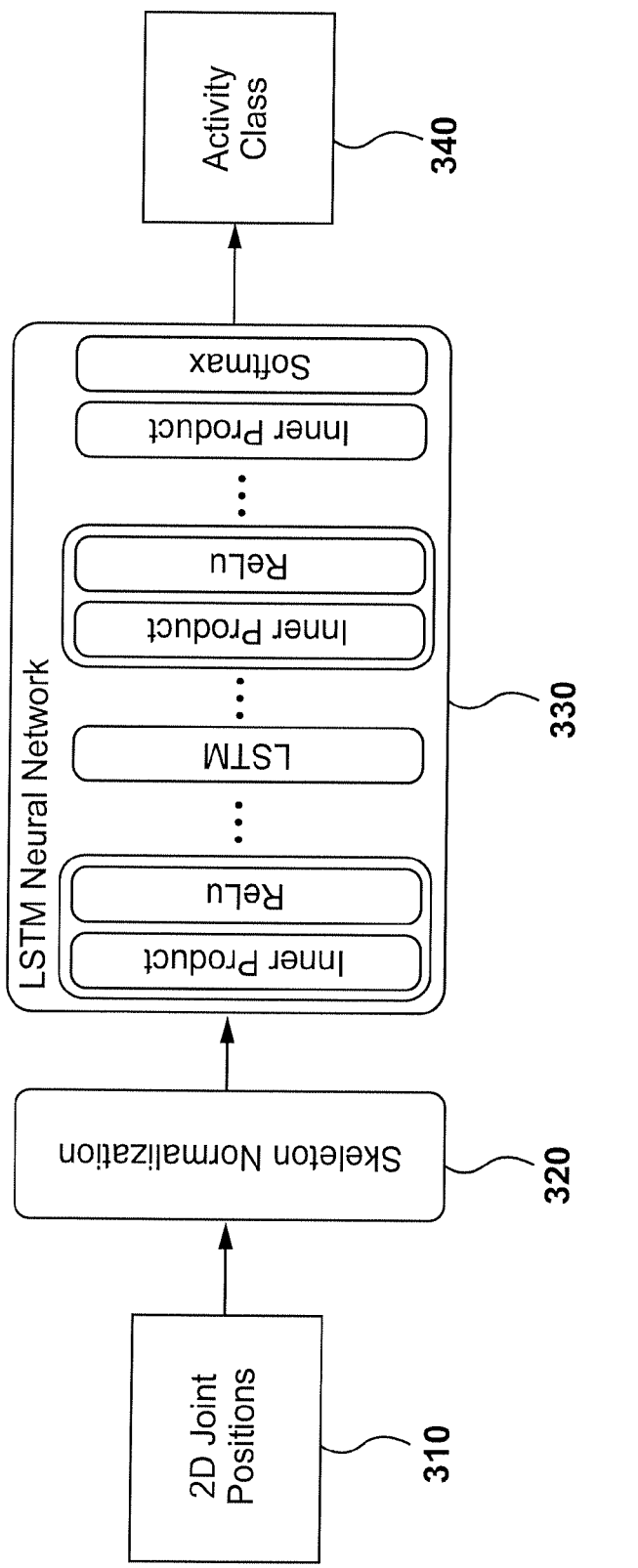
FIG. 3 is a schematic representation of an embodiment of a left-handed activity classifier.

With reference to FIG. 3, for example, the left-handed activity classifier may be implemented as a long-short-term memory (LSTM) RNN that accepts flipped and non-flipped joint-coordinates as input and comprises as series of fully connected layers, activation layers (e.g. rectified linear unit layers), LSTM layers and softmax layers.

With reference to FIG. 3, in an embodiment, the left-handed activity classifier is implemented as a long-short term memory (LSTM) neural network that accepts 2D joint positions of a person as input, and outputs a one-hot vector representation of an estimated activity class. In other words, in the output vector, one element of the output vector corresponding to the estimated class has a high value. In this embodiment classifier, the input 2D joint positions may be first normalized into a [0,1] coordinate space 320 and then passed to a series of stacked inner-product layers, restricted linear unit (ReLu) layers and LSTM layers before being passed to a softmax layer, 330, which computes the output class 340. The inner product layers and LSTM layers may be parameterized by trainable weights that are learned by training on a database of labelled activity data.

The left-right class flip module 50 may accept an activity class or plurality of class probabilities of one particular handedness from the handed activity classifier inferred on flipped input data and may produce the corresponding activity class or plurality of class probabilities of opposite handedness. As an example, if the left-handed activity class inferred by the left-handed activity classifier is "waving with left hand", the left-right class flip module 50 may produce "waving with right hand" to be passed to the class aggregator module 60. While referred to as a left-right class flip module, the class flip module 50 may flip classes vertically, forward/back or some other transformation depending on the application and the transformations performed by the transform module.

The class aggregator module 60 may accept left-handed and right-handed activity classes or class probabilities from the result of the activity classifier inferring on flipped and non-flipped input data and may produce a single class or plurality of class probabilities (e.g. 'none' if no activity recognized by either input, a non-'none' class if recognized by either input and a single activity class chosen by some rule if both inputs are non-'none' or a combined class). As an example, if inputs to the class aggregator module 60 is "none" for the non-flipped input data and "waving with right hand" from the left-right class flip module 50, then the class aggregator module 60 may produce "waving with right hand" as the output class. Similarly, if the input to the class aggregator module 60 is "waving with left hand" for the non-flipped input data and "none" from the left-right class flip module 50, then the class aggregator module 60 may produce "waving with left hand" as the output class. If the input to the class aggregator module 60 is "waving with left hand" for the non-flipped input data and "waving with the right hand" for the flipped input data the class aggregator module 60 may produce a single aggregate class such as "waving with both hands" or a single class such as "waving with the right hand" if requirements of the use-case only require a single handed class to be identified or a plurality of classes such as "waving with left hand" and "waving with right hand".

Depending on the requirements of the use-case, in one embodiment, the class aggregator module 60 may instead produce a plurality of classes. For example, the class aggregator may only produce as output those input classes that are not "none", and so may output a varying number of outputs, depending on the input.

If the input to the class aggregator is a plurality of class probabilities from the handed activity classifier 40 and from the left-right flip class module 50, in one embodiment, the output may be a single most probable class or a combined set of class probabilities of both left- and right-classes.

These described system modules may be separate software modules, separate hardware units or portions of one or more software or hardware components. For example, the software modules may consist of instructions written in a computer language such as the Python programming language, C++ or C# with suitable modules, such as created using software from Caffe, TensorFlow, or Torch, and run on computer hardware, such as a CPU, GPU or implemented on an FPGA. The system may be run on desktop, mobile phone or other platforms such as part of an embedded systems that includes suitable memory for holding the software and activity data. The system may be integrated with or connect to the capture device.

Figure 2:
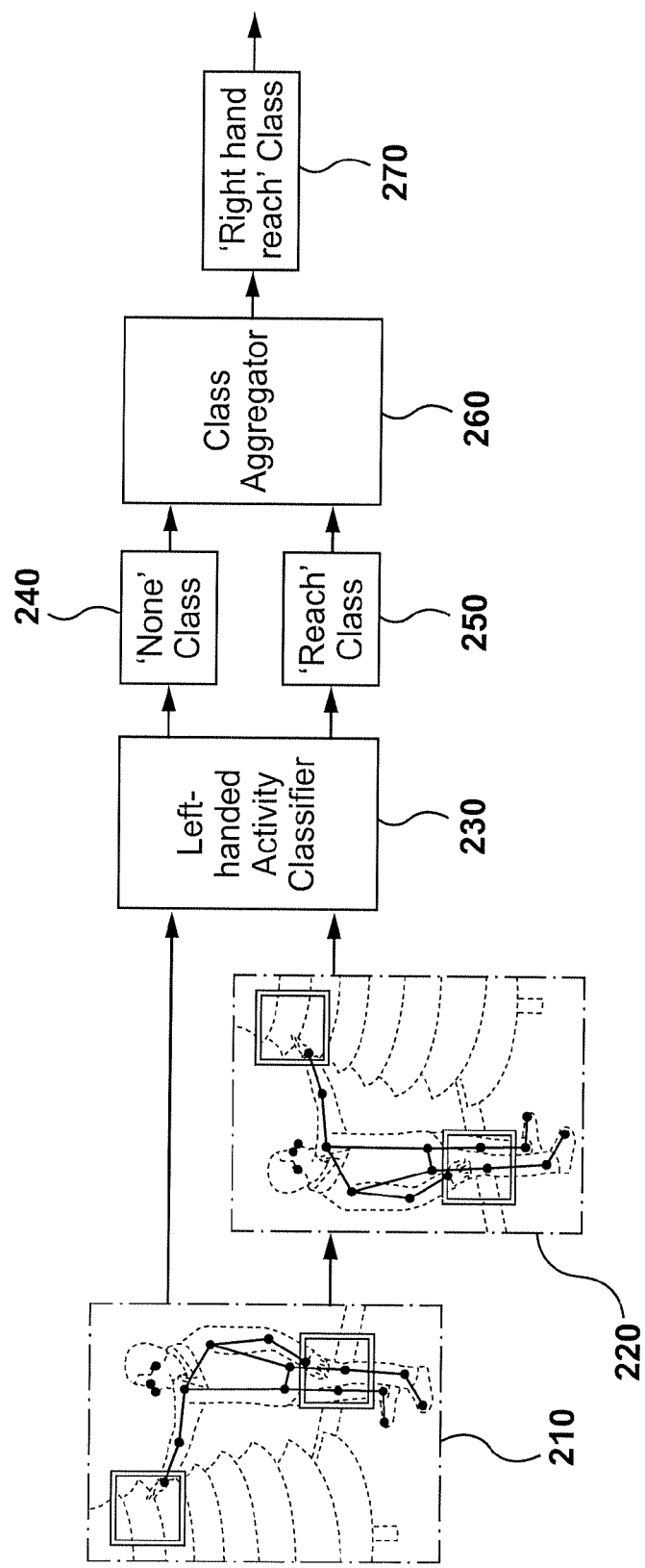
FIG. 2 is a schematic representation of an embodiment of a use case of the activity recognition system.

With reference to FIG. 2, in an example, a frame from a video depicting a person reaching for an ornament on a tree 210 is provided by the capture device. Joints and bone connections (in blue) and bounding boxes around the person's hands (in fuchsia) have been overlaid onto the frame as examples of additional or alternative forms of input data that may be provided by the capture device. The original 210 and horizontally flipped 220 frame images are passed to a left-handed activity classifier 230. The left-handed activity classifier 230 recognizes the 'reach' activity class 250 in the flipped input, where the left arm of the person appears to be reaching. With the original input, where the right arm appears to be reaching, the left-handed activity classifier 230 produces a 'none' activity class 240. In this example, the class aggregator 260 determines that the resulting output class is 'right hand reach' given that a 'reach' activity was only detected in the flipped input.

Training Method

In the preferred case that the handed activity classifier 40 is implemented as some machine learning-based module, it may be parameterized by trainable weights that need to be trained on a class-labelled database of activity data. In this case, the training activity data is in the same format as to be provided by the capture device.

In this embodiment, the following training procedure may be used. For training instances with a class label representing a right-handed activity, the class label may be flipped to represent the corresponding left-handed activity label and the associated instance activity data, such as the skeleton data or video frame data, may also be flipped horizontally such that the right-handed activity appears as a left-handed activity. Performing these transforms produces a training dataset with only left-handed class labels and correctly corresponding instance activity data. The handed activity classifier 40 may then be trained on this transformed training dataset and may only learn to recognize left-handed activities.

The above procedure describes a way to create a dataset with only left-handed activities, but an equivalent procedure may be used to create a dataset with only right-handed activities. In either case, the handed activity classifier 40 may be trained on a dataset containing only example activities of a single handedness.

Training may be performed on a publicly available dataset (e.g. MPII, UFC101) or other training dataset (e.g. in-house captured and/or annotated dataset), with the back-propagation algorithm (or other appropriate learning algorithm) in an appropriate training framework such as Caffe (or TensorFlow, Torch, etc.) using appropriate hardware such as GPU hardware (or CPU hardware, FPGAs, etc.).

The embodiments of the invention described above are intended to be exemplary only. It will be apparent to those skilled in the art that variations and modifications may be made without departing from the disclosure. The disclosure includes all such variations and modifications as fall within the scope of the appended claims.

The invention claimed is:

1. An activity classifier system comprising:
    a capture device which captures activity data;
    a transform module which receives the activity data from the capture device and transforms the activity data using a symmetric transformation;
    an activity classifier that identifies activities using received activity data having a determined symmetry and outputs an inferred activity class or plurality of class probabilities;
    a class flip module which receives the inferred activity class or class probabilities from the activity classifier using the transformed activity data from the transform module and flips the activity classes using a transformation corresponding to the symmetric transformation to produce flipped inferred activity classes; and
    a class aggregator that receives the flipped inferred activity classes and the inferred activity class from the activity classifier using the activity data from the capture device, and generates an output activity class based on which activity class is dominant or a combined plurality of class probabilities.

2. The activity classifier system of claim 1 wherein the transform module is a horizontal flip transform module and the class flip module is a left-right class flip module.

3. The activity classifier system of claim 2 wherein the horizontal flip transform module reverses each x-coordinate of the activity data to transform the activity data.

4. The activity classifier system of claim 2, wherein the left-right class flip module flips right-handed activities to left-handed activities and vice versa.

5. The activity classifier system of claim 1 wherein the class aggregator generates an output comprising a combination of the activity classes or class probabilities of the flipped inferred activity classes and the inferred activity classes.

6. The activity classifier system of claim 1 wherein the class aggregator generates an output comprising a combination of the activity classes of the flipped inferred activity class and the inferred activity class which are not a default class.

7. The activity classifier system of claim 1 wherein the activity data is skeleton data of a human.

8. The activity classifier system of claim 7 wherein the skeleton data of a human comprises an array of X and Y coordinates for skeleton joints over a time period.

9. The activity classifier system of claim 1 wherein the activity data is skeletal key-points, images, or video.

10. A method of classifying activities comprising capturing activity data;
transforming the activity data using a symmetric transformation;
identifying an inferred activity class or plurality of class probabilities inferred from the activity data having a determined symmetry;
identifying an inferred activity class or plurality of class probabilities inferred from the transformed activity data having a determined symmetry;
flipping the inferred activity class or plurality of class probabilities from the transformed activity data using a transformation corresponding to the symmetric transformation to produce a flipped inferred activity class or plurality of class probabilities; and
producing one or more activity classes or class probabilities by combining the flipped inferred activity class or class probabilities and the inferred activity class or class probabilities from the activity data.

11. The method of classifying activities of claim 10 wherein transforming the activity using a symmetric transformation comprises horizontally flipping the activity data and wherein flipping the inferred activity data from the transformed activity data comprises flipping a left/right classes identifier.

12. The method of classifying activities of claim 11 wherein the horizontally flipping the activity data comprises reversing each x-coordinate of the activity data.

13. The method of classifying activities of claim 10 wherein combining the flipped inferred activity class or class probabilities and the inferred activity class or class probabilities from the activity data comprises combining activity classes of the flipped inferred activity class and the inferred activity class which are not a default class.

14. The method of classifying activities of claim 10 wherein the activity data is skeleton data of a human.

15. The method of classifying activities of claim 14 wherein the skeleton data of a human comprises an array of X and Y coordinates for skeleton joints over a time period.

16. The method of classifying activities of claim 10 wherein the activity data is skeletal key-points, images, or video.

17. A method of training a machine learning system using a set of training instances, each training instance including a class label and activity data comprising:
identifying training instances with a label associated with a first asymmetry;
for each identified training instance, modifying the identified training instance by
transforming the label associated with the instance to a label opposite of the first asymmetry; and
transforming the activity data associated with the instance using a transform associated with the first asymmetry;
training the machine learning system using the modified set of training instances; and
wherein as a result of the modifications to the training instances, none of the training instances are labelled with the first asymmetry.

18. The method of claim 17 wherein the first asymmetry is left-handed, transforming the label comprises transforming left-handed labels with a right-handed label and transforming the activity data comprises horizontally flipping the activity data.

19. The method of claim 17 wherein the first asymmetry is right-handed, transforming the label comprises transforming right-handed labels with a left-handed label and transforming the activity data comprises horizontally flipping the activity data.

20. The method of claim 18 wherein horizontally flipping the activity data comprises reversing each x-coordinate of the activity data.

* * * * *